(12) United States Patent
Rosenloecher

(10) Patent No.: US 7,238,308 B2
(45) Date of Patent: Jul. 3, 2007

(54) PROCESS FOR THE INFILTRATION OF POROUS CARBON COMPOSITES

(75) Inventor: Jens Rosenloecher, Augsburg (DE)

(73) Assignee: Audi AG (DE)

( * ) Notice: Subject to any disclaimer, the term of this patent is extended or adjusted under 35 U.S.C. 154(b) by 588 days.

(21) Appl. No.: 10/389,028

(22) Filed: Mar. 14, 2003

(65) Prior Publication Data

US 2003/0178733 A1 Sep. 25, 2003

(30) Foreign Application Priority Data

Mar. 19, 2002 (DE) .................................. 102 12 043

(51) Int. Cl.
*C04B 35/65* (2006.01)
*C04B 35/573* (2006.01)

(52) U.S. Cl. ..................... 264/29.1; 264/642; 264/643; 264/682

(58) Field of Classification Search ................ 264/643, 264/642, 682, 628, 29.1, 129, 651; 164/97; 419/45, 27; 228/36
See application file for complete search history.

(56) References Cited

U.S. PATENT DOCUMENTS

| | | | |
|---|---|---|---|
| 2,665,999 A * | 1/1954 | Koehring | 427/445 |
| 3,294,489 A * | 12/1966 | Millington et al. | 423/447.4 |
| 3,495,939 A * | 2/1970 | Forrest | 423/346 |
| 4,120,731 A | 10/1978 | Hillig et al. | |
| 4,141,948 A * | 2/1979 | Laskow et al. | 264/101 |
| 5,079,195 A * | 1/1992 | Chiang et al. | 501/92 |
| 5,205,970 A * | 4/1993 | Brun et al. | 427/227 |
| 5,340,655 A * | 8/1994 | Creber et al. | 428/446 |
| 5,503,213 A * | 4/1996 | Pyzik et al. | 164/97 |
| 5,571,758 A | 11/1996 | Grossman | |
| 5,665,464 A * | 9/1997 | Takayasu et al. | 428/312.2 |
| 6,030,913 A * | 2/2000 | Heine et al. | 501/88 |
| 6,110,535 A | 8/2000 | Rey et al. | |
| 6,467,620 B1 * | 10/2002 | Heckman et al. | 206/459.5 |
| 6,503,441 B2 * | 1/2003 | Corman et al. | 264/635 |
| 6,670,039 B1 * | 12/2003 | Nagle et al. | 428/408 |
| 6,793,873 B2 * | 9/2004 | Gadow et al. | 264/646 |
| 2005/0244581 A1 * | 11/2005 | Thebault et al. | 427/249.2 |

FOREIGN PATENT DOCUMENTS

| | | |
|---|---|---|
| DE | 27 60422 C2 | 9/1977 |
| DE | 40 35 746 | 5/1991 |
| DE | 197 11 831 A1 | 9/1998 |
| DE | 197 10 105 B1 | 5/2001 |

* cited by examiner

*Primary Examiner*—Carlos Lopez
(74) *Attorney, Agent, or Firm*—Connolly Bove Lodge & Hutz LLP

(57) ABSTRACT

A process form producing ceramic composites comprising metal carbides, which comprises the steps production of a porous carbon-containing intermediate body, infiltration of the intermediate body with the melt of a carbon-forming metal, reaction of at least part of the carbon of the intermediate body with the carbide-forming metal to form a metal carbide, with at least part of the carbide-formed metal being supplied via at least one wick made of porous carbon material having pore channels and the wick being produced by carbonization of wood materials or of essentially unidirectionally reinforced CFRP, such wicks and their use in the abovementioned process.

10 Claims, No Drawings

PROCESS FOR THE INFILTRATION OF POROUS CARBON COMPOSITES

FIELD OF THE INVENTION

The invention relates to a process for the infiltration of porous carbon composites. In particular, it relates to a process for producing ceramic composites comprising metal carbides, in particular SiC-containing composites and C/SiC composites (composites reinforced with carbon fibers and comprising silicon carbide in the matrix), by means of infiltration of molten metal into carbon-containing intermediate bodies using porous wicks, and also to the use of carbonized wood materials or CFRP materials (polymers reinforced with carbon fibers) as wick material for the melt infiltration.

BACKGROUND OF THE INVENTION

Among ceramic composites comprising metal carbides, carbon fiber reinforced SiC ceramics, which include the C—C/SiC (composites reinforced with carbon fibers and comprising silicon carbide and carbon in the matrix) and C/SiC material systems, have in recent times achieved particular industrial importance.

As preferred process for producing fiber-reinforced SiC, C—C/SiC or C/SiC composites, liquid silicon infiltration (LSI) has been found to be particularly advantageous for numerous applications such as brake and clutch discs, satellite mirrors and combustion chamber linings.

The LSI process comprises the following significant steps:
 a) production of a CFRP (=carbon fiber reinforced polymer) intermediate body,
 b) carbonization of the intermediate body to give a porous carbon-containing green body, typically a C/C body (carbon fiber reinforced carbon),
 c) melt infiltration of the green body with a silicon melt,
 d) reaction of at least part of the carbon of the green body with the silicon to form SiC, giving a carbon fiber reinforced composite ceramic having a matrix comprising SiC, Si and C.

Such a process is known, for example, from DE-A 197 10 105.

Composites having matrices comprising other metal carbides can be produced in an analogous manner by melt infiltration with the appropriate metal carbide-forming metals. Both the semimetals silicon and boron and the metals iron, nickel, titanium, zirconium, vanadium, chromium, molybdenum and tungsten and any alloys of these metals and semimetals are of importance here. In the interests of simplicity, the abovementioned semimetals will hereinafter be referred to as metals, too.

The technically simplest method of supplying the metal melt is to cover the porous green body with a bed of metal powder, in particular silicon powder, which becomes liquid on heating above its melting point and is taken up into the pores of the green body by capillary action. However, this simple process has the serious disadvantage that the sometimes very fluid melt can flow unhindered down from the green body and away without infiltration taking place, i.e. without penetration of the melt into the hollow spaces in the interior of the green body. The uptake of metal can therefore be controlled only with difficulty. In particular, special measures have to be taken to prevent the body which is coated and/or impregnated with metal from becoming firmly joined (soldered) to the crucible or the substrate by means of a connecting metal layer.

These problems can be avoided when the metal, in particular silicon, is present in the form of a shaped body (known as silicon donor shaped body) or when significant proportions of the metal melt are supplied via porous substrates or wick materials.

For the present purposes, "wicks" are porous bodies which draw in liquids by capillary action and can release them at another point. Taking off the liquid at this other point enables transport of the liquid through the wick to take place.

Thus, for example, in EP-A 0 995 730, a process is proposed for producing silicized shaped bodies in which silicon powder or silicon granules are combined with a binder and shaped to give a shaped body and the green body is infiltrated with the silicon which, at an appropriate temperature, flows downward from the silicon donor shaped body onto the green body. However, this process entails the risk that the residues of the silicon donor shaped body sinter onto or conglutinate with the silicized composite and can be removed completely only by means of costly after-treatment of the surface.

One way of supplying liquid silicon via porous substrates and wicks is described in DE-A 197 11 831. Instead of placing the shaped body directly in a graphite crucible coated with boron nitride, it is also possible to use, as an alternative, a porous SiC charging plate which stands on feet in the silicon melt or is connected thereto via porous wicks. A relatively large amount of granulated silicon can be introduced into the crucible to produce the melt, since the melt rises from below via the porous feet and the porous charging plate into the shaped body. Although the silicon can be supplied efficiently in this way, in particular by use of porous wicks, the problem of conglutination of the composite with the SiC charging plate is not solved satisfactorily. In addition, the overall construction comprising wick and plate uses a lot of material and is costly, and is therefore unacceptable for mass production.

Furthermore, the use of carbon felts as wick material and placing the green body directly on the wicks dipping into a silicon melt is also known. The carbon felts have to have sufficient strength combined with a very high porosity. Such felts are disproportionately expensive, particularly for mass production.

SUMMARY OF THE INVENTION

It is therefore an object of the invention to provide a process for the controlled supply of metal melts to porous carbon-containing green bodies and to provide the materials required for this purpose. At the same time, the process costs, in particular the material costs, and the outlay for loading the infiltration furnace and for subsequent machining of the infiltrated composites should be reduced compared to the prior art.

This object is achieved according to the invention by the metal melt being introduced directly into the green body via wicks made of porous carbon material over small contact areas, with wood materials or CFRP bodies having a high directed porosity being used as starting material for the wicks.

The invention accordingly provides a process for producing ceramic composites comprising metal carbides, which comprises the following steps
 production of a porous carbon-containing green body, infiltration of the green body with the melt of a carbide-forming metal, reaction of at least part of the carbon of the green body with the carbide-forming metal to form a metal carbide, wherein at least part of the carbide-forming metal is supplied via at least one wick made of porous carbon material having pore channels, with the wick being produced by carbonization of wood materials or of CFRP which is essentially unidirectionally reinforced by fibers.

DETAILED DESCRIPTION OF THE PREFERRED EMBODIMENTS

Preference is given to using a C/C composite as porous carbon-containing intermediate body.

In the process of the invention, it is preferred that the green bodies are placed directly on wicks which are made of porous carbon-containing material and whose lower ends dip into the metal melt. The melt which feeds the wick is typically formed from powder, granules or shaped bodies of the metal concerned, which are usually located as a loose bed in coated or lined graphite crucibles as receivers of the melt, during heating to the infiltration temperature. The wicks are in this case at least partly surrounded by the metal concerned.

It is not absolutely necessary for all of the metal melt to be supplied via the wicks. Rather, preference is given to a proportion of the melt which depends on the green body geometry and porosity to be supplied via a bed of metal powder or granules or metal shaped bodies directly on or adjacent to the green body. This combination of wicks and a bed increases the infiltration rate and its uniformity over the total green body. The important factor is that the melt formed from the bed is either retained on the surface of the green body or cannot flow away from it unused. A further advantage of the wicks is observed here, since metal melt flowing off from the green body is collected in the crucible and is conveyed back to the green body by the wicks and is utilized for infiltration. In this way, the amount of melt supplied can also be readily controlled in an advantageous manner.

Preference is given to using wicks of porous carbon-containing material which are obtained by carbonization of wood or unidirectionally fiber-reinforced CFRP.

Wood has the great advantage over the carbon felts which have hitherto customarily been used of being very inexpensive and having virtually unlimited availability. The particular suitability of wood as wick material is due to its unique structure. Wood is a natural composite having a highly ordered and regular microstructure which would be virtually impossible to produce by engineering means. The parallel channel pores (hereinafter also referred to as mesopores) which run in the growth direction in the wood and perform the task of water transport in the living wood are the decisive factor in giving it its wick function. Continuous pore channels are formed by these. Wood itself is not suitable as wick material because of its high content of water and volatile organic constituents. To obtain the wicks of carbonized wood which are preferred according to the invention, wood is dried at temperatures of from 40 to 95° C. and carbonized at temperatures of at least 650° C., preferably in the range from 700° C. to 1500° C. However, it is likewise possible to utilize known carbonization processes. During carbonization, the wood loses a significant part of its mass and shrinks without the typical microstructure being lost. According to the invention, use is made of types of wood which undergo a loss in mass of at least 50%, preferably at least 60% and particularly preferably at least 70%, during carbonization. The density of the carbonized wood is in the range from 0.1 to 0.9 g/cm$^3$, preferably from about 0.5 to 0.6 g/cm$^3$. The most important parameter for the flow performance of the wicks is their porosity, in particular in the parallel and open mesopores, measured as the proportion of the total volume of the material concerned which is made up by the pores. Open pores are pores which are accessible from the surface of the body. According to the invention, the open porosity achieved after carbonization is at least 15% and not more than 60%, preferably at least 20% and particularly preferably in the range from 21 to 44%. The preferred range of the total porosity is from 40 to 90%, particularly preferably from 65 to 85%.

The diameter and size distribution of the pores depend on the type of wood, with two sharply differentiated diameter ranges typically being formed: micropores in the range from about 1 μm to about 50 μm and the mesopores in the range from about 50 to 600 μm. The mean diameter of the mesopores which is preferred according to the invention for dry or carbonized wood is in the range from 100 to 600 μm, particularly preferably in the range from 200 to 400 μm. The wood is preferably processed so that the mesopores run parallel to the longitudinal direction of the wicks. These wicks are typically aligned so that the parallel pore channels impinge on the surface of the green body at an acute angle, preferably at an angle of from 0° to not more than 45° to the normal to the surface. An arrangement parallel to the normal achieves the maximum flow performance. Among types of natural wood, it is possible to use wood from conifers and broad-leaved trees, with balsa, pine, oak, maple, beech, ebony and bamboo being particularly useful. However, it is also possible to use customary wood materials such as particle board, pressed wood, synthetic wood or wood molding compositions. In these materials, however, pore channels which are fully continuous right through the wick can no longer be formed because of the use of wood powder, wood shavings or wood pieces. Likewise, the pore channels generally no longer have a distinct preferential direction. However, the mesopores preferred for melt transport are fully retained even here. Any reduction in the flow performance due to the absence of the entirely parallel pore channels can easily be compensated by means of a slight increase in the cross section of the wick.

In a further advantageous embodiment of the invention, the raw material used for producing wicks is not a wood material but instead a CFRP in which parallel pore channels having diameters in the range of mesopores are formed after carbonization as a result of the particular type of fiber reinforcement. According to the invention, fiber reinforcement is effected by unidirectionally aligned carbon fibers, with small proportions of fibers running transverse thereto also being able to be used to stabilize the material perpendicular to the unidirectional fibers. Preference is given to using CFRP bodies having a volume fraction of at least 30% of parallel carbon fibers, which may, if desired, be coated. The carbonizable polymer is preferably selected from among phenolic resins, epoxy resins and polyurethanes. To produce the porous wick material, the CFRP body is preferably carbonized at temperatures above 650° C. The volume fraction of fibers and the carbon yield of the polymer are matched so that the carbonized wick material has an open porosity of at least 15%, preferably at least 20% and particularly preferably at least 45%; the preferred maximum value is 60%. According to the invention, the pores predominantly form continuous parallel channels. Here too, pore diameters of from about 50 to 600 µm are preferred, with the same further preferred ranges as described above. When CFRP is used as raw material for the wick material, it becomes possible to realize pore size ranges and distributions which cannot be formed by natural wood. Likewise, it is possible to produce curved wicks or wicks having a relatively complex geometry in which the pore channels run completely internally and always parallel to the outer contours, in contrast to the case of wood in which only straight pore channels are present.

In the melt infiltration of the green body, a particularly small contact area to the green body is particularly desirable, since this is the area which tends to undergo conglutination between wick and composite. Owing to the good strength and high flow performance of the wick materials used according to the invention, it is possible to use comparatively thin wicks. The wicks are preferably broader at the base than at the contact area to the green body resting thereon. Typical geometric embodiments are truncated cones, cones, truncated pyramids or pyramids. Furthermore, preference is given to a plurality of wicks being joined to one another by means of porous carbon material. In particular because of the low cost of the wood materials, it is then also possible to realize relatively complicated wick constructions, for example cohesive wicks, wick/baseplate constructions in which the wicks are joined to a baseplate of carbonized wood or wick/crucible constructions in which the wicks are integrated into crucibles made of carbonized wood.

According to the invention, both the wood-based wick materials and the CFRP-based wick materials contain free carbon. The function of the wicks presumably depends on the possibility of a chemical reaction between the carbon of the wick material and components of the melt to form metal carbides. This obviously significantly aids the capillary action for melt transport. The wicks of the invention and the infiltration process are therefore not restricted to the carbon fiber reinforced SiC-containing composites produced by the LSI process by means of infiltration of porous carbon bodies with silicon melts. Rather, the wick materials are also suitable for infiltration of melts of other carbide-forming metals. In this way, it is also possible to produce other metal carbide-containing composites by the melt infiltration process. Examples of carbide-forming metals which can be used are iron, nickel, titanium, zirconium, vanadium, chromium, molybdenum, tungsten and boron and alloys thereof. Particular preference is given to using alloys of these metals with silicon.

The process presented thus also makes it possible to produce metal carbide ceramics which are reinforced with carbon fibers and whose matrix comprises, inter alia, SiC, ZrC, TiC, TiSi$_x$ and/or MoSi$_x$ in an inexpensive manner.

The wick materials of the invention are particularly preferably used in the production of plate-like or disc-shaped C/SiC components, e.g. brake or clutch discs. In the case of mass-produced products such as brake or clutch discs, the cost advantage of the wicks made from wood materials is of particular significance.

The invention claimed is:

1. A process for producing ceramic composites comprising metal carbides, which comprises the following steps:
    drying wood at a temperature of from 40° C. to 95° C.,
    carbonizing the dried wood at a temperature of from 700° C. to 1500° C., to obtain a body having a density of from 0.1 g/cm$^3$ to 0.9 g/cm$^3$
    forming a wick from the carbonized wood having a total porosity of from 40% to 90%, and an open porosity of from 15% to 60%, with mesopores in the carbonized wood running parallel to a longitudinal direction of the wick,
    producing a porous carbon-containing green body by placing the green body on the wick so that pore channels in the wick impinge on the surface of the green body at an angle of from 0° to not more than 45° to the normal of the surface,
    infiltrating the green body with the melt of a carbide-forming metal via the wick,
    reacting at least part of the carbon of the green body with the carbide-forming metal to form a metal carbide,
    wherein at least part of the carbide-forming metal is supplied via the wick.

2. The process as claimed in claim 1, wherein the green body is placed directly on the wicks whose lower ends dip into a metal melt.

3. The process as claimed in claim 1, wherein the porous carbon-containing green body used is a C/C composite.

4. The process as claimed in claim 1, wherein the carbide-forming metal used is selected from the group consisting of silicon, iron, nickel, titanium, zirconium, vanadium, chromium, molybdenum, tungsten, boron and alloys of at least two of these elements.

5. The process as claimed in claim 3, wherein at least one of the compounds selected from the group consisting of SiC, ZrC, TiC, TiSi$_x$ and MoSi$_x$ is formed in by the infiltration and reaction steps.

6. The process as claimed in claim 1, wherein the wick is produced by the carbonisation from a wood material selected from the group consisting of natural wood, pressed wood, wood molding compositions and synthetic wood.

7. The process as claimed in claim 6, wherein the natural wood is selected from the group consisting of balsa, pine, oak, maple, beech, ebony and bamboo.

8. A process for producing ceramic composites comprising metal carbides, which comprises the following steps
    providing a CFRP body reinforced with unidirectionally aligned carbon fibers, with a proportion of fibers running transverse thereto to stabilize the material perpendicular to the unidirectional fibers,
    carbonizing the CFRP body at a temperature in excess of 650° C. to form a wick consisting of a carbonized CFRP body reinforced with unidirectional carbon fibers having an open porosity of from 15% to 60%, and having pores forming continuous parallel channels with pore diameters of from 50 pm to 600 pm,
    producing a porous carbon-containing green body by placing the green body on the wicks so that the pore channels in the wick impinge on the surface of the green body at an angle of from 0° to not more than 45° to the normal of the surface,
    infiltrating the green body with the melt of a carbide-forming metal via the wick,
    reacting at least part of the carbon of the green body with the carbide-forming metal to form a metal carbide,
    wherein at least part of the carbide-forming metal is supplied via the wick.

9. The process as claimed in claim 1, wherein the wick material has an open porosity in the range from 21% to 44%.

10. The process as claimed in claim 8, wherein the predominant proportion of the pore channels of the wick impinge on the green body at an angle in the range from 45° to 0° to the normal of the surface of the green body.

* * * * *

UNITED STATES PATENT AND TRADEMARK OFFICE
CERTIFICATE OF CORRECTION

| | | |
|---|---|---|
| PATENT NO. | : 7,238,308 B2 | Page 1 of 1 |
| APPLICATION NO. | : 10/389028 | |
| DATED | : July 3, 2007 | |
| INVENTOR(S) | : Jens Rosenlöcher | |

It is certified that error appears in the above-identified patent and that said Letters Patent is hereby corrected as shown below:

On the Title Page: item [57]

In the Abstract, line 1 "A process form producing ceramic composites comprising" should read -- A process for producing ceramic composites comprising --.

Signed and Sealed this

Twenty-third Day of October, 2007

JON W. DUDAS
*Director of the United States Patent and Trademark Office*